(12) United States Patent
Marwede et al.

(10) Patent No.: US 8,686,638 B2
(45) Date of Patent: Apr. 1, 2014

(54) LIGHTING DEVICE HAVING A PLURALITY OF LIGHT SOURCES

(75) Inventors: Alexandra Marwede, Hamburg (DE); Ronny Dehmel, Schemmerhofen-Grafenwald (DE)

(73) Assignee: Airbus Operations GmbH, Hamburg (DE)

( * ) Notice: Subject to any disclaimer, the term of this patent is extended or adjusted under 35 U.S.C. 154(b) by 144 days.

(21) Appl. No.: 13/378,262

(22) PCT Filed: Jun. 21, 2010

(86) PCT No.: PCT/EP2010/003731
§ 371 (c)(1),
(2), (4) Date: Dec. 14, 2011

(87) PCT Pub. No.: WO2010/149325
PCT Pub. Date: Dec. 29, 2010

(65) Prior Publication Data
US 2012/0098455 A1  Apr. 26, 2012

Related U.S. Application Data

(60) Provisional application No. 61/219,043, filed on Jun. 22, 2009.

(30) Foreign Application Priority Data

Jun. 22, 2009  (DE) .......................... 10 2009 029 874

(51) Int. Cl.
*H05B 37/00* (2006.01)
(52) U.S. Cl.
USPC ............................ 313/598; 313/504; 313/506
(58) Field of Classification Search
USPC ................................ 313/495–512; 445/24–25
See application file for complete search history.

(56) References Cited

U.S. PATENT DOCUMENTS 4,099,091 A * 7/1978 Yamazoe et al. ............... 313/509
4,666,793 A * 5/1987 Hirate ........................... 428/690
(Continued)

FOREIGN PATENT DOCUMENTS

DE    10338205    3/2005
DE    10347987    6/2005
(Continued)

OTHER PUBLICATIONS

Database WPI Week 200814, Thomson Scientific, London, GB; AN 2008-B80705, XP002596263.
(Continued)

*Primary Examiner* — Anh Mai
*Assistant Examiner* — Elmito Breval
(74) *Attorney, Agent, or Firm* — Wood, Herron & Evans, LLP

(57) ABSTRACT

A lighting device having a plurality of light sources includes several superimposed layers. The superimposed layers include a first and a second electrically conductive layer, which are designed so as to create an alternating electrical field between the layers. The superimposed layers also have an electrically insulating layer between the electrically conductive layers and a luminescent layer between the electrically conductive layers. Electroluminescent material is arranged within the luminescent layer in several adjacent and spatially separated regions, each region forming a light source. As a result, a simulated starry sky may be provided when the lighting device is used with an aircraft interior trim panel.

20 Claims, 4 Drawing Sheets

(56) References Cited

U.S. PATENT DOCUMENTS

| | | | |
|---|---|---|---|
| 4,777,402 A | 10/1988 | Mitsumori | |
| 5,416,494 A * | 5/1995 | Yokota et al. | 345/79 |
| 2008/0246389 A1 | 10/2008 | Meincke et al. | |
| 2010/0165622 A1 | 7/2010 | Geudner et al. | |

FOREIGN PATENT DOCUMENTS

| | | |
|---|---|---|
| DE | 102006009635 | 9/2007 |
| DE | 102007029140 | 1/2009 |
| DE | 102008048835 | 4/2010 |
| EP | 1705626 | 9/2006 |
| WO | 2006102013 | 9/2006 |

OTHER PUBLICATIONS

European Patent Office, International Search Report, Form PCT/ISA/210 (3 pgs.), and Written Decision of the International Search Authority, Form PCT/ISA/237 (5 pgs.), Sep. 27, 2010.

\* cited by examiner

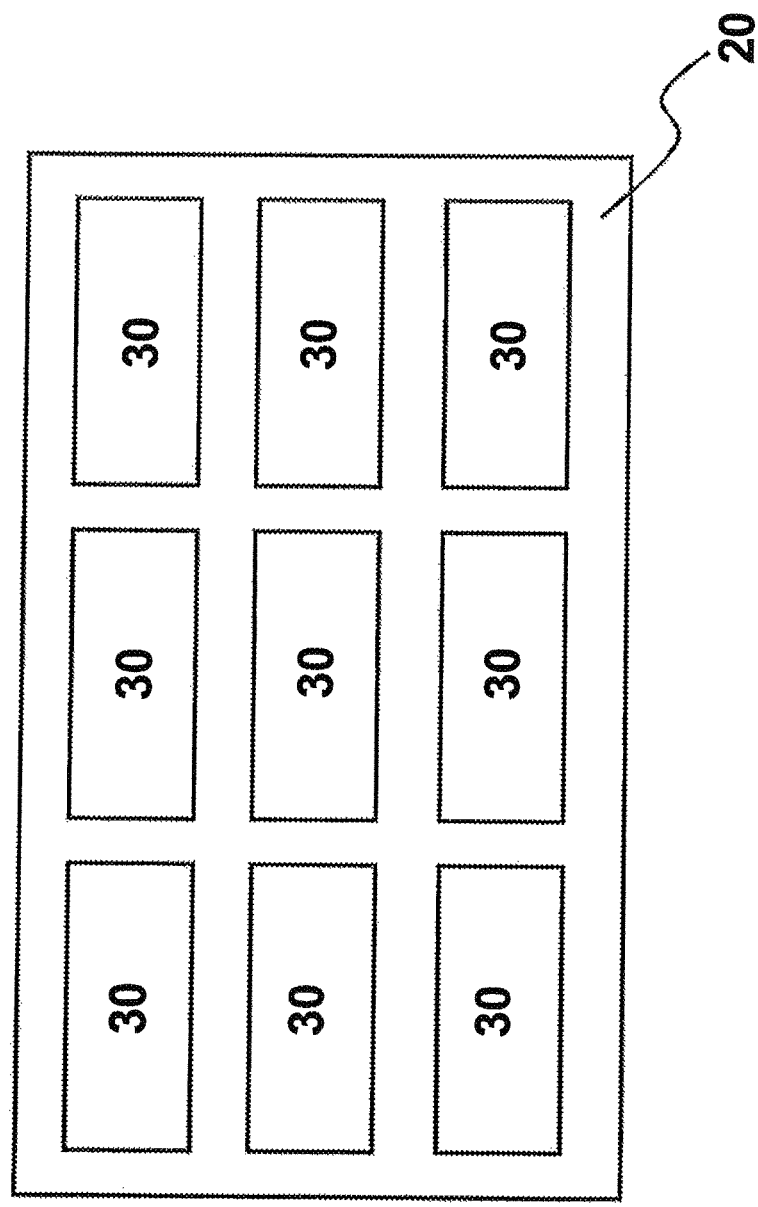

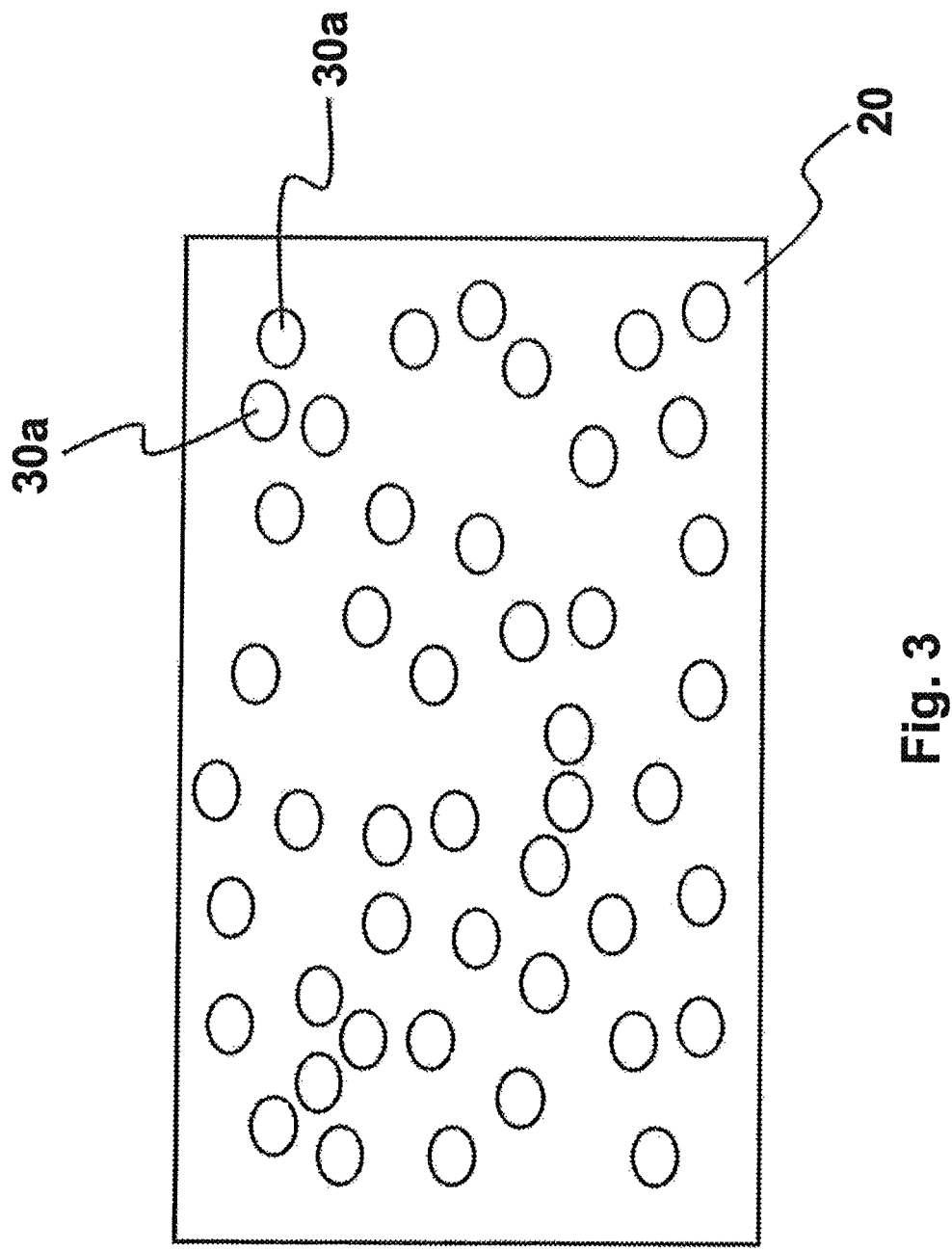

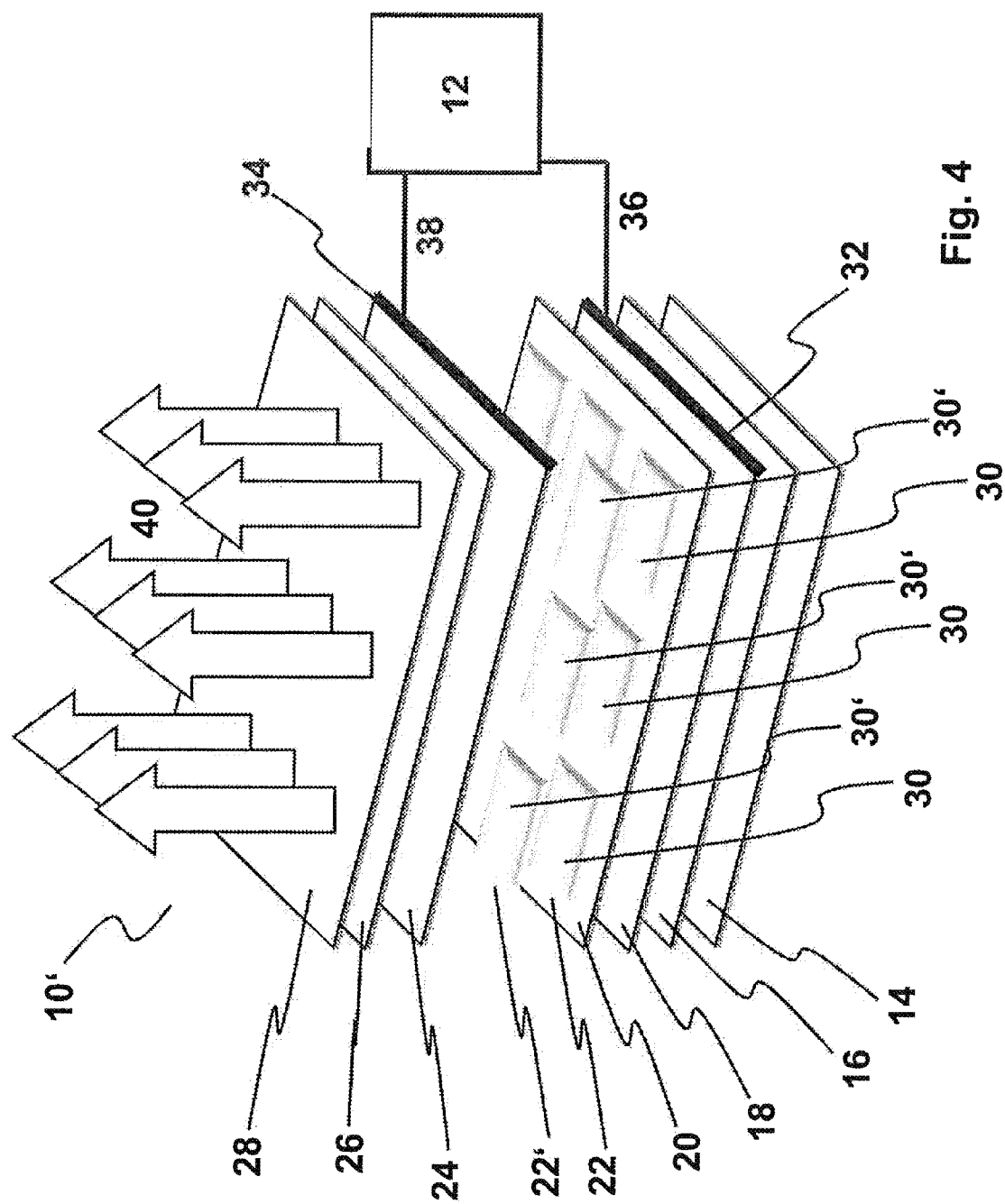

LIGHTING DEVICE HAVING A PLURALITY OF LIGHT SOURCES

This application claims priority under Section 371 and/or as a continuation under Section 120 to PCT Application No. PCT/EP2010/003731, filed on Jun. 21, 2010, which claims priority to German Application No. 10 2009 029 874.6 and U.S. Provisional Application No. 61/219,043, both filed on Jun. 22, 2009.

TECHNICAL FIELD

The invention relates to a lighting device having a plurality of light sources, which comprises a layer structure having several superimposed layers.

BACKGROUND

DE 10 2007 029 140 and DE 10 2008 048 835 each discloses a lighting device having a plurality of light-emitting diodes in a ceiling element, in which each light-emitting diode is connected to a voltage source via in each case two electric cables. For each light-emitting diode, the lighting device has a holder, which holds a light-emitting diode in a desired position in the lighting device. Furthermore, the lighting device has a plurality of cable guides, which prevent the electric cables from passing too close to or touching the light-emitting diodes, which can lead to a cable defect due to overheating or covering of the emitting surface of the light-emitting diodes. It is a disadvantage of the known lighting device that the outlay for its production is relatively high, because the light-emitting diodes and cables must be fitted into the lighting device, or connected to the holders, by hand, and automated production is not possible.

This known lighting device is used in aircraft cabins to produce a simulated starry sky. The simulated starry sky is thereby produced by the lighting device, which has several hundred light-emitting diodes and is mounted on an interior trim panel. In order to produce such a lighting device, the several hundred light-emitting diodes with the associated copper cables must be fitted, or laid, by hand. This requires a high outlay in terms of time. In addition, manual production gives rise to a high error potential (for example when determining the cable lengths and producing the electrical connections between the cables and the light-emitting diodes), so that follow-up work is frequently necessary.

The known lighting device additionally has a relatively high weight owing to the large number of components such as light-emitting diodes, copper cables, holders and cable guides which are used. The large number of copper electric cables in particular leads to an increase in the weight. Furthermore, the known lighting device requires a relatively large amount of space because of the size of the light-emitting diodes with cables soldered to their pins, so that the cabin height is reduced when the known lighting device is used in an aircraft cabin to produce a simulated starry sky.

Also known are electroluminescent films, in which a layer consisting of an electroluminescent material is excited to emit light radiation by an alternating electrical field produced by two electrode layers. In the electroluminescent films, the layer of electroluminescent material and the electrode layers have the same dimensions and are arranged congruently one above the other, so that an electroluminescent film forms a flat light source. Electroluminescent films are flexible but can only be applied to simple three-dimensional bodies, such as, for example, a circular cylinder. Application to more complex three-dimensional bodies, such as, for example, a sphere, is not possible. Moreover, electroluminescent films have a relatively large thickness and a relatively high weight, which makes their use unattractive in particular in aircraft cabin construction.

The invention is directed to the object of providing a lighting device having a plurality of light sources, which can be produced in a simple manner, has a low weight, is space-saving and can be applied in a simple manner to complex three-dimensional bodies.

In order to achieve that object, a lighting device having a plurality of light sources is provided, the lighting device comprising several superimposed layers, having a first and a second electrically conductive layer, which are configured to produce an alternating electrical field between them, an electrically insulating layer between the electrically conductive layers, and a luminescent layer between the electrically conductive layers, wherein electroluminescent material is arranged within the luminescent layer in several spatially separated regions, each of which forms a light source. The spatially separated regions are arranged in the luminescent layer in different planes.

SUMMARY OF THE INVENTION

The lighting device according to the invention is characterised in that the plurality of light sources are supplied with electrical energy via only two electrically conductive layers acting as electrodes. The electrically conductive layers can be a back electrode and a front electrode. In order to produce the alternating electrical field, only the first and second electrically conductive layers have to be connected to an AC voltage source. Because it is not necessary to connect each light source individually to a voltage source via associated cables, the outlay in terms of production is reduced considerably. Furthermore, by avoiding having a large number of cables, a significant weight reduction is achieved. By constructing the lighting device in several superimposed layers, a space-saving arrangement is possible. Furthermore, because of the layer structure, the lighting device according to the invention, in particular with large surface areas of, for example, several square meters, can be produced by machine. The layer structure of the lighting device according to the invention can also be applied to any desired substrate.

The first and second electrically conductive layers can be, for example, layers of an electrically conductive plastics material and/or layers containing silver, aluminium, indium oxide or indium tin oxide. The electroluminescent material can be, for example, zinc sulfide doped with various metals such as gold, silver, cobalt, gallium or manganese. The colour of the light radiation emitted by the electroluminescent material can be changed by the strength and composition of the doping. The electrically insulating layer can be a material having a high dielectric constant, as a result of which the degree of efficiency of the lighting device can be improved. In particular, the layers of the lighting device can be hydrophobic layers in order to protect the electroluminescent material from the effects of moisture. The working life of the lighting device can thereby be increased.

In order to prevent moisture from penetrating the electroluminescent material, first and second moisture-impermeable layers can be provided, between which the luminescent layer is located. In particular, the first moisture-impermeable layer can be located between the second electrically conductive layer and the luminescent layer, and the second moisture-impermeable layer can be located between the first electrically conductive layer and the electrically insulating layer. The moisture-impermeable layers can be, for example, layers of aluminium oxide having a thickness of approximately 2 µm. Alternatively or in addition, in order to increase the working life of the lighting device, it is possible to use as the electroluminescent material a microencapsulated luminophor in which the individual luminophor particles are encapsulated in a thin aluminium oxide layer.

In order to provide light radiation with a high light intensity in a desired direction, the electrically insulating layer can have light-reflecting properties. As a result, light radiation emitted by the electroluminescent material in an undesired direction can be reflected into a desired main radiation direction. In order that the amount of light radiation lost is low, the electrically insulating layer can have high reflectivity.

In order to protect the layers of the lighting device from external influences without substantially weakening the light radiation, a transparent protective layer can be arranged on the side of the lighting device that is facing away from the luminescent layer. In particular, the transparent protective layer can be arranged on the side of the second electrically conductive layer or of the second moisture-impermeable layer that is facing away from the luminescent layer.

For the simple production of the lighting device, the layers of the lighting device can be dried lacquer and/or liquid layers. In particular, at least some of the layers can be applied in succession by spraying and/or printing, which permits production by machine (in particular of lighting devices having a large surface area).

Preferably, at least one of the layers of the lighting device is inflexible, and the layers have a partially curved, three-dimensional form. In particular, the layers can be applied to three-dimensional bodies having a complex three-dimensional structure (for example a sphere or a hyperboloid). For example, the layers of the lighting device can be applied by spraying, brushing or printing. As a result, the lighting device can be matched exactly to the form of a substrate, which leads to an additional saving in terms of space.

According to a preferred embodiment, the thickness of the luminescent layer is in a range from 15 µm to 25 µm and in particular is 20 µm. With such layer thicknesses of the luminescent layer, good light intensities can be achieved with a low weight and a small space requirement.

According to a further preferred embodiment, the thickness of the electrically insulating layer is in a range from 11 µm to 21 µm and in particular is 16 µm. In particular when the electrically insulating layer is located on the luminescent layer, such layer thicknesses yield good light intensities with a low weight and a small space requirement.

In order that the emitted light radiation has a high light intensity, the second electrically conductive layer can be closer to the luminescent layer than to the electrically insulating layer, can be at least partly transparent and can have a thickness in a range from 1 µm to 9 µm, in particular in a range from 2 µm to 4 µm. With such layer thicknesses of the second electrically conductive layer, and owing to the at least partly transparent configuration thereof, only low absorption of the light radiation takes place at the second electrically conductive layer. As a result, the degree of efficiency of the lighting device can be increased further.

In order to produce a stable alternating electrical field, the first electrically conductive layer can be arranged closer to the electrically insulating layer than to the luminescent layer and can have a thickness in a range from 11 µm to 20 µm. Preferably, the thickness of the first electrically conductive layer is 15 µm.

In order to provide light sources that are illuminated with substantially equal light intensities, the spatially separated regions of the luminescent layer can be arranged so that they do not overlap. Alternatively, the spatially separated regions can also be arranged in the luminescent layer so that they overlap at least partially.

The spatially separated regions can be of the same size. Alternatively, it is also conceivable for the spatially separated regions to be of different sizes. In particular, the spatially separated regions can be arranged irregularly. The spatially separated regions can thereby be at different distances from one another. According to a preferred embodiment, the spatially separated regions can each have a circular form with a diameter in a range from 0.5 mm to 5 mm, in particular 1 mm. Such an embodiment can advantageously be used to produce a simulated starry sky.

In order to provide a substantially homogeneous radiation distribution of the lighting device, the spatially separated regions can lie at corner points of a regular tessellation. The regular tessellation can consist, for example, of equilateral triangles, squares or regular hexagons. If the layer structure of the lighting device has a three-dimensional form, the regular tessellation can also be projected onto the three-dimensional form.

The invention relates further to an interior trim panel for an aircraft cabin having a lighting device according to the invention. In particular, the lighting device can be used to produce a simulated starry sky.

BRIEF DESCRIPTION OF THE DRAWINGS

Preferred embodiments of the present invention will now be explained in greater detail with reference to the accompanying schematic figures, in which:

FIG. 2 shows a top view of a first embodiment of an electrically insulating layer with electroluminescent material applied thereto;

FIG. 3 shows a top view of a second embodiment of an electrically insulating layer with electroluminescent material applied thereto; and FIG. 4 shows an exploded perspective view of a second embodiment of a lighting device according to the invention.

DETAILED DESCRIPTION

Figure 1:
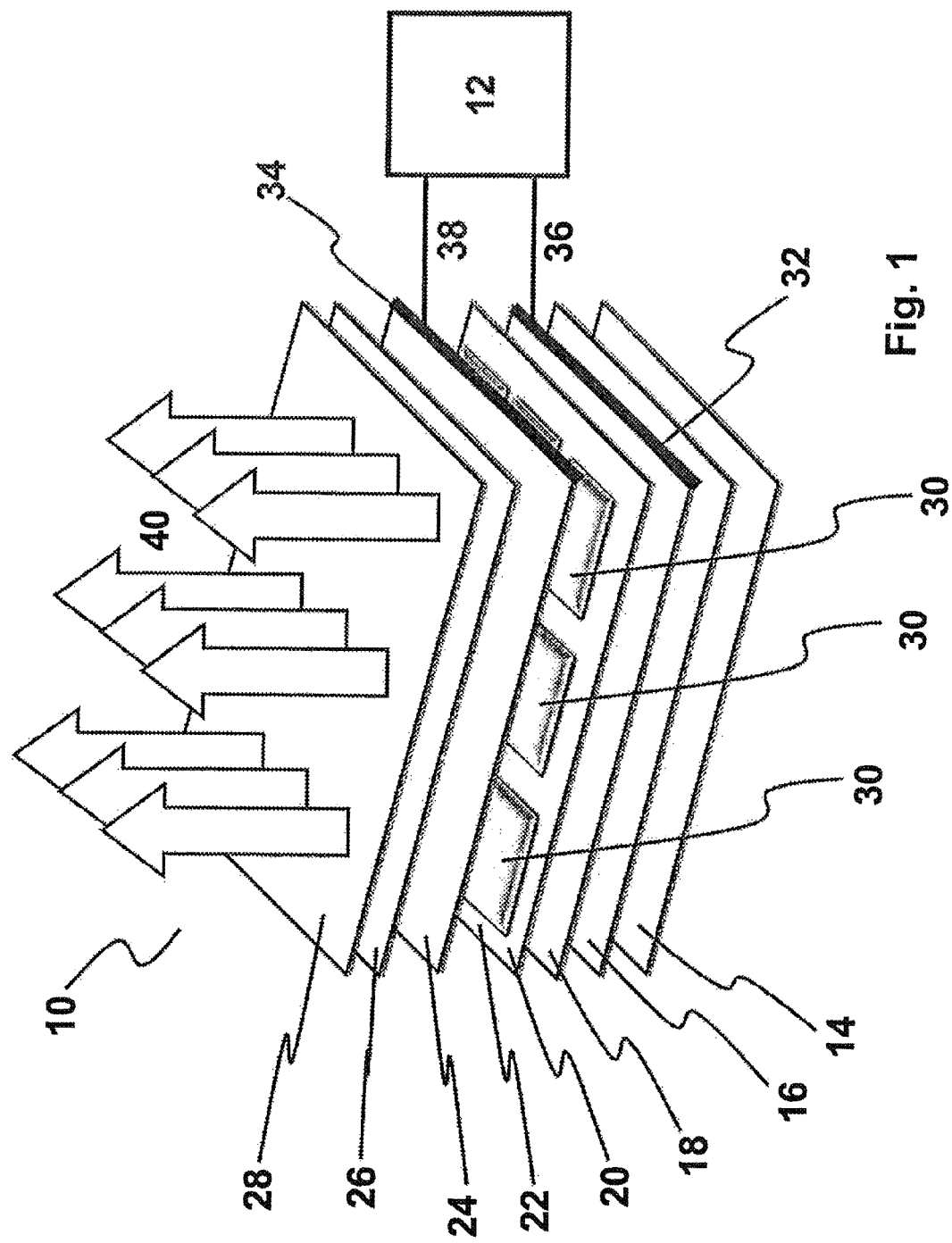
FIG. 1 shows an exploded perspective view of a first embodiment of a lighting device according to the invention.

FIG. 1 shows, in schematic form, an exploded perspective view of a lighting device 10 and of an AC voltage source 12. The lighting device 10 consists of a layer structure having a plurality of superimposed layers. The lighting device 10 comprises (from bottom to top in FIG. 1) a first protective layer 14, a first moisture-impermeable layer 16, a first electrically conductive layer 18 in the form of a back electrode, an electrically insulating layer 20, a luminescent layer 22, a second electrically conductive layer 24 in the form of a front electrode, a second moisture-impermeable layer 26 and a second protective layer 28.

In the luminescent layer 22, a plurality of regions 30 of an electroluminescent lacquer are arranged spatially separated from one another in a plane. The electroluminescent lacquer contains zinc sulfide. Each of the several regions 30 has a rectangular form. The first protective layer 14 can be applied to a substrate, for example an interior trim panel of an aircraft cabin (not shown). Between the first protective layer 14 and the interior trim panel there can further be arranged a primer layer (not shown). In particular, the interior trim panel can have any desired three-dimensional form, the layers of the lighting device 10 having the same three-dimensional form as the interior trim panel. One side of the second protective layer 28 faces the interior of the aircraft cabin.

The first 14 and the second 28 protective layers consist of a plastics material which protects the intermediate layers 16 to 26 from damage, the second protective layer 28 consisting of a transparent material. The first 16 and the second 26 moisture-impermeable layers consist of aluminium oxide and prevent moisture from penetrating the intermediate layers 18 to 24. The second moisture-impermeable layer 26 is likewise transparent. By preventing moisture from penetrating the luminescent layer 22, the working life of the lighting device 10 is increased. A further increase in the working life of the lighting device 10 can be achieved by dissipating heat from the lighting device 10. To that end, the lighting device 10 can have a heat-dissipating layer (not shown) between the interior trim panel and the luminescent layer 22. The heat-dissipating layer can be a heat-conductive paste.

The first electrically conductive layer 18 is a silver layer, and the second electrically conductive layer 24 is a layer of an intrinsically conductive polymer. Alternatively, the second electrically conductive layer 24 can also be a transparent plastics layer which has a content of metal. The luminescent layer 22 is applied to the electrically insulating layer 20. In addition to electrically insulating properties, the electrically insulating layer 20 also has light-reflecting properties. In particular, the electrically insulating layer 20 consists of a material having a high dielectric constant and high reflectivity.

A first connecting lug 32 is attached to the first electrically conductive layer 18, and a second connecting lug 34 is attached to the second electrically conductive layer 24. In order to produce an alternating electrical field between the first 18 and the second 24 electrically conductive layers, the AC voltage source 12 is connected to the first 32 and the second 34 connecting lugs via two cables 36 and 38. The AC voltage source 12 produces an alternating voltage in a range from 30 to 250 V with a frequency in a range from 50 to 2000 Hz. Other voltage and frequency ranges are conceivable. The electroluminescent material 30 is excited to emit electromagnetic radiation in the form of light radiation 40 by the alternating electrical field. Light emitted in the direction of the electrically insulating layer 20 is reflected by that layer and emitted into the interior of the aircraft cabin as light radiation 40. Owing to the excitation of the luminescent layer 22 by the alternating electrical field, each of the spatially separated regions 30 acts as a light source. Consequently, a plurality of light sources can be supplied with energy by means of two electrodes 18 and 24 and two connecting cables 36 and 38.

A production process for the production of the lighting device 10 shown in FIG. 1 is described by way of example hereinbelow. In particular, the production process can be carried out by a programmed lacquering robot using a spray head.

First, a primer layer is applied to a substrate, for example an interior trim panel. After drying or curing of the primer layer, the first protective layer 14 is applied to the primer layer by spraying. After drying of the first protective layer 14, the first moisture-impermeable layer 16, the first electrically conductive layer 18 and the electrically insulating layer 20 are each applied in succession by spraying and dried.

Subsequent spray application of the regions 30 of electroluminescent material to the electrically insulating layer 20 is carried out with the aid of a mask (not shown) in which openings corresponding to the regions 30 are formed. The electroluminescent material is consequently sprayed onto the electrically insulating layer 20 only in the regions 30. Alternatively, the regions 30 can be sprayed, printed or brushed with electroluminescent material individually, without the use of a mask.

After drying of the electroluminescent material 30, the second electrically conductive layer 24, the second moisture-impermeable layer 26 and the second protective layer 28 are applied and dried in succession. Additional layers can be applied between layers 14 to 28 by spraying. Finally, the connecting lugs 32 and 34 are attached to the electrically conductive layers 18 and 24.

Because the layers applied by spraying are relatively thin, the space requirement of the layer structure is also small. Furthermore, the sprayed-on layer structure has a low weight and can be sprayed onto large surfaces, in particular large surfaces having a complex three-dimensional structure, by machine. After curing of the sprayed-on layers, the lighting device 10 has high stability.

FIG. 2 shows a top view of a first embodiment of an electrically insulating layer 20 with regions 30 of an electroluminescent material applied thereto. The layers of FIG. 2 can be used in the lighting device 10 shown in FIG. 1. The regions 30 each have the same rectangular form, so that six light sources of equal size are provided. As a result, substantially evenly emitted light distribution is achieved.

FIG. 3 shows a top view of a second embodiment of an electrically insulating layer 20 with regions 30a of an electroluminescent material applied thereto. The layers of FIG. 3 can be used in the lighting device 10 shown in FIG. 1. The regions of electroluminescent material 30a are of circular form and have a diameter in a range from 0.5 mm to 5 mm. Smaller diameters are conceivable. The regions 30a are arranged irregularly on the electrically insulating layer 20, i.e. the regions 30a are at different distances from one another. A simulated starry sky can be produced by this arrangement of the regions 30a on the electrically insulating layer 20. In particular, several hundred regions 30a can be applied to the electrically insulating layer 20. It is also conceivable for the regions 30a shown in FIG. 3 to have different diameters and/or to be regions having different geometric forms. The regions 30a can in principle have any geometric form so that, for example, illuminated writing, displays or handles can be produced.

FIG. 4 shows, in schematic form, an exploded perspective view of a lighting device 10' and of an AC voltage source 12. The lighting device 10' of FIG. 4 corresponds to the lighting device 10 of FIG. 1, except that an additional luminescent layer 22' is provided above the luminescent layer 22. The luminescent layer 22' corresponds to the luminescent layer 22. As in the luminescent layer 22, a plurality of regions 30' of an electroluminescent lacquer are arranged in the additional luminescent layer 22' spatially separated from one another in a plane. In particular, the luminescent layer 22' is applied to the luminescent layer 22. For example, after application, or spraying, and drying of the luminescent layer 22, the luminescent layer 22' was applied to or sprayed onto the luminescent layer 22. The regions 30' and 30 can be so arranged that they do and/or do not overlap. It is also conceivable for further luminescent layers to be provided above the luminescent layer 22'.

By arranging the electroluminescent material 30, 30' in different planes, a lighting device 10' with different light intensities can be provided in a simple manner. Thus, electroluminescent material 30' arranged closer to the light exit surface of the lighting device 10' appears brighter to the observer than electroluminescent material 30 arranged further away from the light exit surface of the lighting device 10'. Consequently, it is possible to produce different lighting intensities using only one lighting device 10'. When the lighting device 10' is used to produce a simulated starry sky, stars that are further away and stars that are less far away can be represented by means of the regions 30' and 30.

The invention claimed is:

1. A lighting device having a plurality of light sources, wherein the lighting device comprises several superimposed layers, having
    a first and a second electrically conductive layer, which are configured to produce an alternating electrical field between them,
    an AC voltage source connected to the first and second electrically conductive layers,
    an electrically insulating layer between the electrically conductive layers,
    a first luminescent layer between the electrically conductive layers, and
    a second luminescent layer that is applied to the first luminescent layer and that is between the electrically conductive layers,
    wherein electroluminescent material is arranged in each of the first and second luminescent layers in several adjacent and spatially separated regions, each of which forms a light source, and the spatially separated regions in the first and the second luminescent layers are arranged in different planes.

2. The lighting device according to claim 1, further comprising:
    a first and a second moisture-impermeable layer, between which the luminescent layers are located.

3. The lighting device according to claim 1, wherein the electrically insulating layer has light-reflecting properties.

4. The lighting device according to claim 1, further comprising:
    a transparent protective layer on the side of the lighting device that is remote from the luminescent layers.

5. The lighting device according to claim 1, wherein the first and second electrically conductive layers, the first and second luminescent layers, and the electrically insulating layer are dried lacquer and/or liquid layers.

6. The lighting device according to claim 1, wherein at least one of the layers is inflexible and the layers have an at least partially curved three-dimensional form.

7. The lighting device according to claim 1, wherein the thickness of the luminescent layers is in a range from 15 μm to 25 μm.

8. The lighting device according to claim 7, wherein the thickness of the luminescent layers is 20 μm.

9. The lighting device according to claim 1, wherein the thickness of the electrically insulating layer is in a range from 11 μm to 21 μm.

10. The lighting device according to claim 9, wherein the thickness of the electrically insulating layer is 16 μm.

11. The lighting device according to claim 1, wherein the second electrically conductive layer is positioned closer to the luminescent layers than to the electrically insulating layer, is at least partly transparent and has a thickness in a range from 1 μm to 9 μm.

12. The lighting device according to claim 11, wherein the second electrically conductive layer has a thickness in a range from 2 μm to 4 μm.

13. The lighting device according to claim 1, wherein the first electrically conductive layer is positioned closer to the electrically insulating layer than to the luminescent layers and has a thickness in a range from 11 μm to 20 μm.

14. The lighting device according to claim 1, wherein the first electrically conductive layer has a thickness of 15 μm.

15. The lighting device according to claim 1, wherein the spatially separated regions of the luminescent layers are arranged so that the spatially separated regions do not overlap.

16. The lighting device according to claim 1, wherein the spatially separated regions are of the same size.

17. The lighting device according to claim 1, wherein the spatially separated regions are of different sizes.

18. The lighting device according to claim 1, wherein the spatially separated regions are arranged irregularly.

19. The light device of claim 1, wherein at least one of the spatially separated regions of the first luminescent layer overlaps at least partially with at least one of the spatially separated regions in the second luminescent layer.

20. An interior trim panel for an aircraft cabin, comprising:
    a panel layer configured to be mounted in the aircraft cabin, and
    a lighting device applied to the panel layer and having a plurality of light sources, wherein the lighting device comprises several superimposed layers, having
        a first and a second electrically conductive layer, which are configured to produce an alternating electrical field between them,
        an AC voltage source connected to the first and second electrically conductive layers,
        an electrically insulating layer between the electrically conductive layers,
        a first luminescent layer between the electrically conductive layers, and
        a second luminescent layer that is applied to the first luminescent layer and that is between the electrically conductive layers,
        wherein electroluminescent material is arranged in each of the first and second luminescent layers in several adjacent and spatially separated regions, each of which forms a light source, and the spatially separated regions in the first and the second luminescent layers are arranged in different planes.

* * * * *